Patented Apr. 24, 1928.

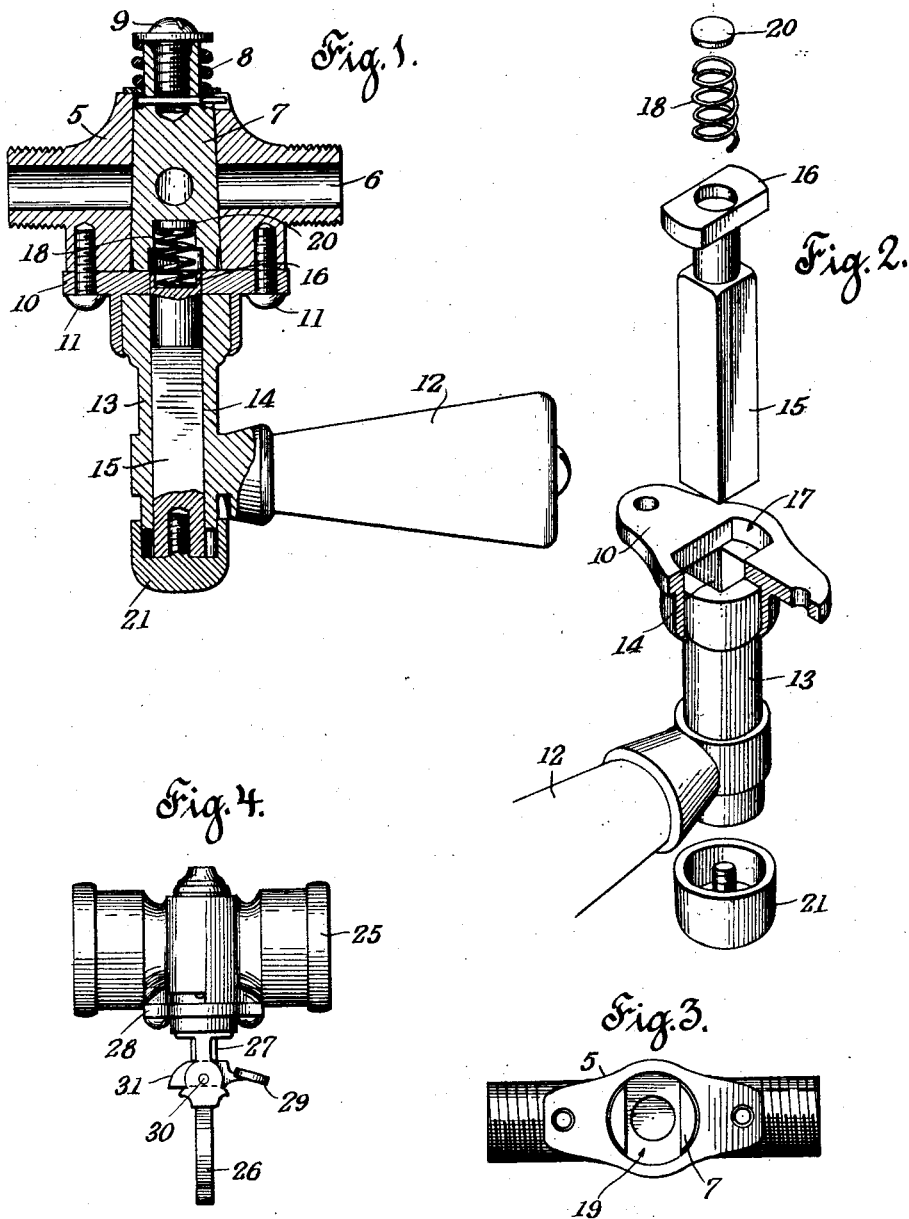

1,667,525

UNITED STATES PATENT OFFICE.

GABRIEL BASHCONGI, OF BROOKLYN, NEW YORK.

SAFETY VALVE.

Application filed November 3, 1927. Serial No. 230,810.

My invention relates particularly to gas valves and a safety attachment for preventing the accidental operation of the valve.

Ordinary gas valves of the plug type are held in place frictionally. Such valves are turned on and off by hand, but frequently work loose and are then accidently operated by vibration or by actual contact of the hand or some other part of the body or clothing. The turning on of the gas valve accidently frequently causes asphyxiation and sometimes results in explosions and fires. It is of the utmost importance, therefore, that a gas valve be so constructed that it can only be operated intentionally or deliberately.

According to my invention I provide a plunger which is normally interlocked between the operating handle or knob and the stationary part of the valve body so that the valve plug cannot be turned by means of the handle. This plunger is adapted to be operated by the thumb or finger to disengage it from the valve body and engage it with the rotatable plug member.

The accompanying drawings illustrate two constructions embodying improvements of my invention.

Fig. 1 is a vertical sectional view showing a construction embodying one form of my invention, the valve being shown turned off and locked.

Fig. 2 is an exploded perspective view showing the principal parts of the interlocking mechanism.

Fig. 3 is a plan view of the body and valve with parts of the knob and interlock removed.

Fig. 4 is a side view of another form of my invention.

The body 5 of the valve may be of any suitable construction and provided with a longitudinal passage 6 for the gas or other fluid. The plug 7 is frictionally supported in the body in the usual manner and provided with a transverse passage adapted to register with the passage 6. This plug may be held in place in any suitable manner, as for instance, by means of a spring 8 and screw 9 for applying pressure to the plug to hold it in its seat. At the other side of the body the cap member 10 is held in place by screws 11.

The handle 12 has a shank 13 with a longitudinal passage 14 in which the plunger 15 is adapted to operate. This plunger and passage are so shaped in cross-section that they do not rotate relative to each other. In this instance the plunger 15 is square in cross-section and the passage 14 is of a corresponding angular shape. The plunger 15 is provided with a head 16 elongated in cross-section and adapted to fit in a correspondingly shaped recess 17 in the cap 10 of the housing, being held in that position normally by the spring 18. The valve plug 7 also has a recess 19 corresponding to the shape of the head 16. A washer 20 may be provided to afford a seat for the spring and also to insure proper pressure of the spring. The outer end of the plunger 15 is provided with a suitable knob or thumb piece 21 which may be secured in place in any suitable manner.

Normally the parts are in the position shown in Fig. 1 when the valve is closed and the head 16 is interlocked with the walls of the cap 10 in the recess 17, so that the handle 12 and its shank 13 and the plunger 15 cannot be turned accidentally or otherwise. When it is desired to open the valve the knob 21 is pressed so as to move the plunger 15 longitudinally in the shank 13 and move the head 16 out of the recess 17 in the stationary cap 10 and into the recess 19 in the end of the valve plug 7 so that the handle 12 and the valve 7 may then be turned to open the valve. When the handle 12 is rotated from the open to the closed position of the valve, the spring 18 moves the head 16 and plunger 15 as soon as the head is turned into the proper position with respect to the recess 17.

In the form of construction, illustrated in Fig. 4, the body 25 is of a conventional form and provided with a plug similar to that of Fig. 1. The operating handle 26 in this case is of the conventional thumb piece type and has the plunger 27 adapted to be interlocked with the cap 28 and the inner plug (not shown) in the same manner as previously described with respect to the form shown in Figs. 1 and 2. In this case the plunger 27 is operated in one direction by a spring (not shown) like spring 18 above described, and is operated in the opposite direction by a small lever 29 pivoted at 30 and provided with a cam surface 31 adapted to press against the end of the plunger 27.

It will be understood that other modifications of the invention may be made without departing from the spirit or scope of the claims.

I claim:

1. A valve comprising a body and cap member, a plug revolvable in the body member, a handle revolvably supported in the cap member and a plunger mounted in the handle and provided with means for interlocking with the cap member or the plug member at will.

2. A valve comprising a body and cap, a valve plug rotatably mounted in the body, a handle, a plunger reciprocable in the handle, said plunger and handle being provided with means for preventing relative rotation of one with respect to the other, said plunger and cap being provided with interlocking means for preventing relative rotation of one with respect to the other, and means for disengaging said interlocking means.

3. A valve comprising a body member having a recess, a plug revolvable in the body member and having a recess, a handle, a plunger mounted in the handle and provided with means for interlocking with said recess in the body member or in the recess in the plug member at will and a spring holding said plunger interlocked with the body member.

4. A valve comprising a body, a valve plug rotatably mounted in the body, a handle, an angular plunger reciprocable in the handle, said plunger and body being provided with interlocking means for preventing relative rotation of one with respect to the other, a spring pressing said plunger to interlocked position, and means for disengaging said interlocking means.

GABRIEL BASHCONGI.